May 19, 1931.  A. G. KERR ET AL  1,805,489
VEHICLE BODY
Filed Dec. 5, 1927  2 Sheets-Sheet 1
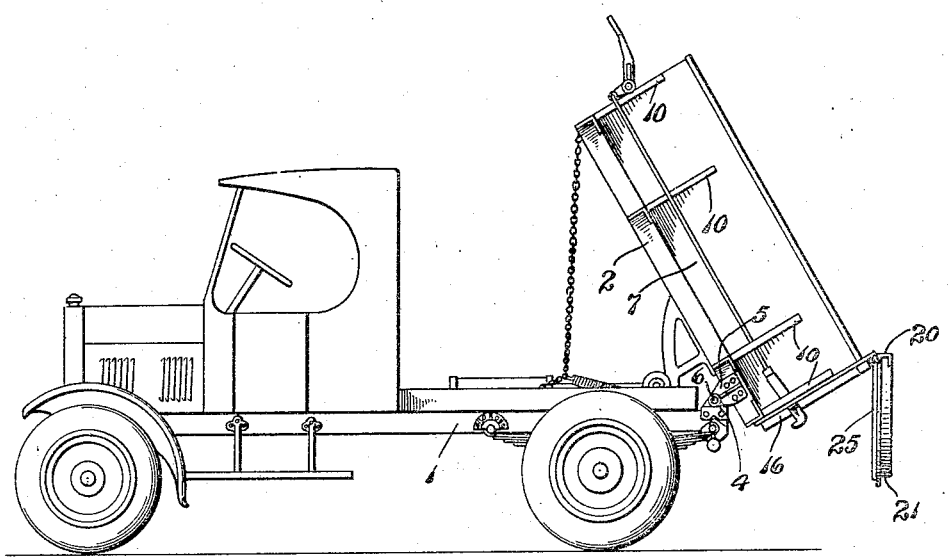
Fig. 1.
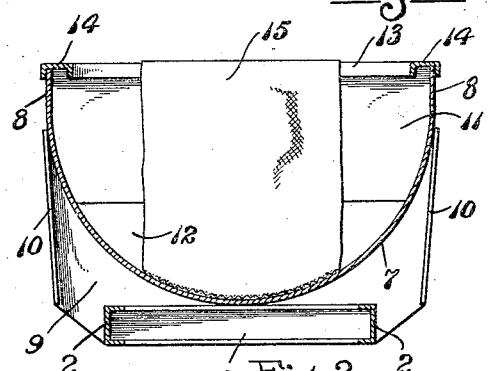
Fig. 2.
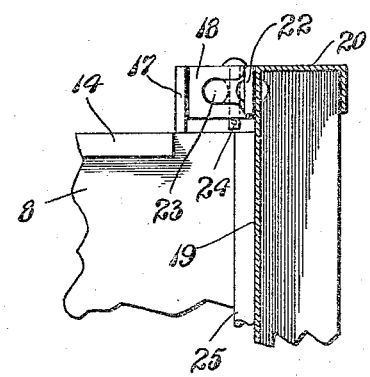
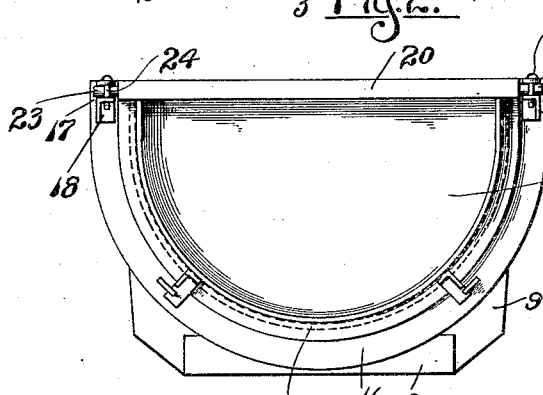
Fig. 3.
Fig. 4.
Inventors
Arthur G. Kerr
Donald Merchant
By Lawrence and
Van Antwerp
Attorneys May 19, 1931.  A. G. KERR ET AL  1,805,489
VEHICLE BODY
Filed Dec. 5, 1927  2 Sheets-Sheet 2

Inventors
Arthur G. Kerr
Donald Merchant
By Liverance & Van Antwerp
Attorneys

Patented May 19, 1931

1,805,489

UNITED STATES PATENT OFFICE

ARTHUR G. KERR, OF SEATTLE, WASHINGTON, AND DONALD MERCHANT, OF SAN FRANCISCO, CALIFORNIA, ASSIGNORS TO WOOD HYDRAULIC HOIST & BODY COMPANY, OF DETROIT, MICHIGAN, A CORPORATION OF MICHIGAN

VEHICLE BODY

Application filed December 5, 1927. Serial No. 237,658.

This invention relates to a dumping body for trucks or similar vehicles which is designed particularly for transporting and dumping cementitious mixtures.

A cementitious mixture of any suitable aggregate with Portland or other equivalent cement mixed with water, heretofore has been difficult to carry any considerable distance from a mixing plant to a place where it is to be used. With a conventional type of body having a flat bottom and vertical sides and ends, there is a strong tendency for the material of the mixture to segregate, the cement settling to the bottom of the body and adhering thereto and eventually setting and hardening thereon. Furthermore the dumping body necessarily must be equipped with a tail gate at the rear end which is unlatched and opened when the body is tilted to dump its contents. A wet cementitious mixture is liable, with the construction of tail gate closure for bodies as heretofore made, to leak at the rear end and drop mixed water and cement on the road over which it is drawn, this being very undesirable for many reasons.

In the invention herein we have constructed a body for use particularly in transporting and dumping wet cementitious mixtures wherein the materials of the mixture do not segregate to anything like the previous degree of segregation, and wherein a simple but effective tail gate structure is provided almost if not completely, eliminating any drip from the body. The present invention is devised for the attainment of these objects and fully attains the same in a practical and efficient manner.

For an understanding of the invention reference may be had to the following description taken in connection with the accompanying drawings, in which, Fig. 1 is a side elevation of a truck equipped with a dumping body of our invention.

Fig. 2 is a transverse vertical section through the body.

Fig. 3 is a rear end elevation of the body illustrating the tail gate.

Fig. 4 is a fragmentary longitudinal vertical section at the rear end of the body illustrating the structure of the tail gate.

Like reference characters refer to like parts in the different figures of the drawings.

Figure 5:
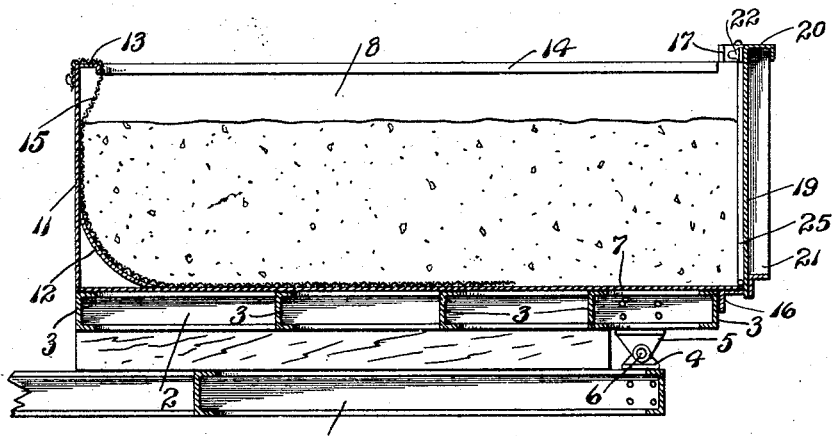
Fig. 5 is a longitudinal vertical section through the body in horizontal position and with the tail gate closed showing the same carrying a load of wet mixture of concrete.

The truck on which the body is mounted may be of any conventional construction having chassis side frame members 1. The body is mounted on an under frame having sills 2 spaced apart and connected by a plurality of suitable cross members 3 welded at their ends thereto to thereby make a strong and durable supporting frame. The chassis members 1 at their rear ends and at their upper sides carry brackets 4 while the sills 2 adjacent their rear ends and at their under sides carry similar brackets 5 mounted on a horizontal rod 6 which extends through the brackets 4 thereby permitting the body to have a tilting movement about the axis of the shaft 6.

Figure 6:
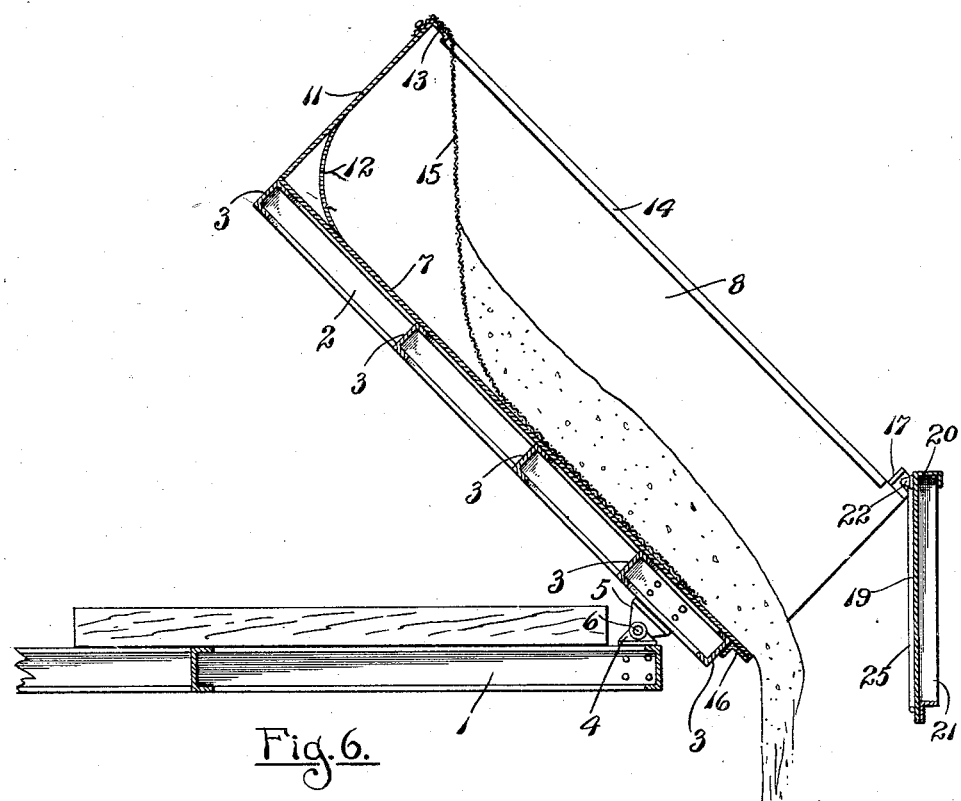
Fig. 6 is a similar section showing the body elevated, the tail gate open and the contents in the process of dumping by gravity therefrom.

The body is located above and carried on the tilting frame. It is made of a single sheet of metal formed into substantially semi-cylindrical form, as indicated at 7, the edge portions 8 of which extend vertically. The body is mounted on the tilting frame by means of a plurality of webs 9 of sheet metal recessed at their upper edges to receive the semi-cylindrical member 7 of the body, the vertical edges of the webs being turned to form flanges 10 which are welded to the sides of the body. The webs are welded or otherwise permanently secured to the tilting frame. The front end 11 of the body is a vertical plate having a welded connection to the semi-cylindrical portion 7. At the front lower corner a curved segment 12 of metal is fitted and welded in place. The upper edge of the front end 11 is turned back upon itself and flanged downwardly making an inverted reinforcing channel 13 while other channels 14 to reinforce and protect the upper edges of the side portions 8 of the body are supplied and permanently attached by welding the same as shown in Figs. 2, 5 and 6. A member 15 of canvas is permanently fastened at its front end to the upper end of the front 11 of the body, passes over the channel 13 and lies lengthwise of the body as shown.

The rear open end of the semi-circular body member 7 is embraced within a U-shaped member 16 of angle iron having ends 17 extending above the upper edges of the body to form supporting posts on which the tail gate is pivotally mounted. The tail gate comprises a substantially semi-circular plate 19 of sheet metal with a reverse channeled upper end 20 and with a substantially semi-circular reinforcing member 21 of angle iron welded to the same at its rear side. Two brackets 22 are permanently secured in spaced apart relation to the upper end of the tail gate plate 19 at its inner side, each having an outwardly extending pin 23 to enter slots made in supporting brackets 18 permanently secured to the upwardly extending ends 17 of the U-shaped member 16. The slots in brackets 18 are open at their rear ends for the ready reception of pins 23 which are retained in said slots by pins 24 passing through the brackets 18 across the slots and back of the pins 23 after seating in said slots.

After the tail gate has been mounted on the body a rod 25, circular in cross section, is bent to snugly fit against the inner side of the body member 7 and while in such position is welded to the plate 19. It is evident by reference to Fig. 4 that the rod 25 bears tightly against the inner sides of the semi-cylindrical body member 7 and that there is an acute angle recess at the front of the rod 25 between it and the adjacent inner side of the body. This recess, indicated at 26, immediately fills with sediment when a wet mixture of concrete is placed within the body and the deposit of sediment together with the tight fit of the rod against the body member 7 provides a substantial seal against water seeping through the joint.

The body is loaded with a load of cementitious mixture such as concrete or the like when it is in horizontal position and with the tail gate closed as shown in Fig. 5. The canvas 15 lies underneath the load.

It has been proven from actual practical service that with a body of the shape described the travel of a truck carrying a load of wet mixed concrete in the body serves to keep the mixture agitated and substantially homogeneous with little or no segregation of the materials of the mixtures and with but little deposit of the finer particles of the mixture, such as in Portland cement used, as do segregate; and what does segregate settles to the bottom on the canvas 15. The cement does not adhere to canvas like it does to steel and when the body is tilted to dump its contents the entire contents, including all depositions of segregated finer particles of the mixture is dumped at the open rear end of the body and the mixture delivered in substantially as good condition as when it was placed in the body.

The transportation of a wet mixture of concrete over considerable distances has been a serious problem and one open to many defects prior to the development of the body structure disclosed herein. This body structure has proven especially practical, serviceable and effective. The invention is defined in the appended claims and is to be considered comprehensive of all forms of structure coming within their scope.

We claim:

1. A truck body comprising, an elongated substantially semi-cylindrical body member, a vertical front plate closing the front end thereof and permanently secured thereto, a pivotally mounted tail gate adapted to close the rear end of the body member when in one position, and an elongated fabric strip attached at its front end to the front end plate of the body near its upper end and adapted to lie within the body and against the bottom thereof, said strip being freely movable relative to the body excepting at said point of attachment.

2. A truck body comprising, an elongated body member of substantially semi-cylindrical form made from a single plate of sheet metal, a metal vertical plate at the front end thereof permanently secured thereto to provide a front end for the body, a curved filler of sheet metal located at the front lower corner of the body and permanently secured to said front end and said body member, an elongated canvas strip attached to said front end plate near its upper edge and lying within and lengthwise of the body and otherwise unconnected therewith, and a tail gate for closing the rear open end of the body.

3. In a truck body having an elongated body member of curved cross sectional form, the combination of a tail gate adapted to abut against one end thereof, and a rod of circular cross section secured to the tail gate and adapted to snugly engage the body member a distance from its end.

In testimony whereof we affix our signatures.

ARTHUR G. KERR.
DONALD MERCHANT.